(12) United States Patent
Sugimori et al.

(10) Patent No.: US 8,494,598 B2
(45) Date of Patent: Jul. 23, 2013

(54) PORTABLE TERMINAL DEVICE WITH LIGHT SOURCE

(75) Inventors: Kenta Sugimori, Kawasaki (JP); Yoshifumi Kajiwara, Kawasaki (JP); Hiroyuki Takita, Kawasaki (JP); Haruyoshi Yada, Kawasaki (JP); Hiroshi Kubo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/042,596

(22) Filed: Mar. 8, 2011

(65) Prior Publication Data

US 2011/0237310 A1  Sep. 29, 2011

(30) Foreign Application Priority Data

Mar. 26, 2010  (JP) .................................. 2010-72091

(51) Int. Cl.
*H04M 1/00* (2006.01)
(52) U.S. Cl.
USPC .................. 455/575.1; 455/556.1; 455/550.1
(58) Field of Classification Search
USPC .......... 455/575.1, 575.3, 575.4, 550.1, 556.1; 340/937; 342/66; 396/434
See application file for complete search history.

(56) References Cited

U.S. PATENT DOCUMENTS

| | | | |
|---|---|---|---|
| 7,423,689 B2 | 9/2008 | Kim et al. | |
| 2002/0065102 A1* | 5/2002 | Miyake et al. | 455/556 |
| 2004/0132491 A1* | 7/2004 | Kim et al. | 455/556.1 |
| 2005/0107117 A1* | 5/2005 | Makino | 455/556.1 |
| 2006/0077649 A1* | 4/2006 | Kumagai | 362/12 |

FOREIGN PATENT DOCUMENTS

JP        2004-215223 A        7/2004

* cited by examiner

*Primary Examiner* — Lester Kincaid
*Assistant Examiner* — Daniel Lai
(74) *Attorney, Agent, or Firm* — Fujitsu Patent Center

(57) ABSTRACT

A portable terminal device includes a front panel covering the front of a housing; a circuit board placed inside the housing so as to face the front panel and having a cutout portion; a flexible substrate having a base end portion connected to the circuit board, extending from the base end portion to the cutout portion, and having a distal end portion placed on a facing surface of the circuit board facing the front panel; an electronic component having a bottom, the bottom which is connected to an intermediate portion of the flexible substrate, and being disposed at a position distant from the front panel than the facing surface of the circuit board; and a light source having a bottom, the bottom which is connected to the distal end portion of the flexible substrate, is smaller in thickness than the electronic component, and emits light toward the front panel.

4 Claims, 5 Drawing Sheets

PORTABLE TERMINAL DEVICE WITH LIGHT SOURCE

CROSS-REFERENCE TO RELATED APPLICATIONS

This application is based upon and claims the benefit of priority from the prior Japanese Patent Application No. 2010-72091 filed on Mar. 26, 2010, the entire contents of which are incorporated herein by reference.

FIELD

The embodiment discussed herein is related to a portable terminal device.

BACKGROUND

A portable terminal device such as a cellular phone has a light source that emits light of various colors or patterns for the purpose of notifying the user of incoming communications. Such a light source is attached on a circuit board placed inside a housing, together with other electronic components.

A specific example of attachment of a light source in a portable terminal device is illustrated in FIG. 5. FIG. 5 is a sectional view of the vicinity of a light source in a portable terminal device. As illustrated in FIG. 5, a circuit board 302 is disposed inside a housing so as to face a front panel 301 that covers the front of the housing. On a facing surface 303 of the circuit board 302 that faces the front panel 301, an LED (Light Emitting Diode) 304 that serves as a light source is mounted. On the facing surface 303 of the circuit board 302, in addition to the LED 304, a receiver 305 is mounted that emits the other party's voice. The LED 304 is smaller in thickness than the receiver 305. Under such a configuration, light emitted from the LED 304 is projected onto the front panel 301 and released outside the device. As a result, the user may be notified of an incoming call.

In a camera-equipped portable terminal device, an LED and a camera are connected by a flexible substrate and mounted on a circuit board in order to enable photographing in a dark place as proposed, for example, in Japanese laid-open Patent Publication No. 2004-215223.

However, when a light source is mounted on a circuit board together with another electronic component and the electronic component is relatively large in thickness, the electronic component prevents the reduction in thickness of the device. That is to say, in the example illustrated in FIG. 5, when the receiver 305 placed between the front panel 301 and the circuit board 302 is relatively large in thickness, the distance between the front panel 301 and the circuit board 302 may not be set smaller than the thickness of the receiver 305. As a result, the receiver 305 makes it difficult to reduce the thickness of the device.

In the above case, a light source that is smaller in thickness than another electronic component is disposed on the same circuit board as the electronic component, and therefore light emitted from the light source may not be efficiently released outside the device. That is to say, in the example illustrated in FIG. 5, the LED 304 is smaller in thickness than the receiver 305. For this reason, the distance between the LED 304 mounted on the same circuit board 302 as the receiver 305 and the front panel 301 is limited by the thickness of the receiver 305, and it is difficult to place the LED 304 smaller in thickness than the receiver 305 close to the front panel 301. As a result, light emitted from the LED 304 is difficult to project onto the front panel 301 and to release outside the device.

SUMMARY

According to an aspect of the invention, a portable terminal device includes a front panel covering the front of a housing; a circuit board placed inside the housing so as to face the front panel and having a cutout portion; a flexible substrate having a base end portion connected to the circuit board, extending from the base end portion to the cutout portion, and having a distal end portion placed on a facing surface of the circuit board facing the front panel; an electronic component having a bottom, the bottom of the electronic component which is connected to an intermediate portion of the flexible substrate, and being disposed at a position distant from the front panel than the facing surface of the circuit board; and a light source having a bottom, the bottom of the light source which is connected to the distal end portion of the flexible substrate, is smaller in thickness than the electronic component, and emits light toward the front panel.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

An embodiment of a portable terminal device disclosed in this application will be described in detail with reference to the drawings. In this embodiment, an example is illustrated in which a portable terminal device disclosed in this application is applied to a cellular phone. However, a portable terminal device disclosed in this application may also be applied to other portable terminal devices such as a PDA (Personal Digital Assistant).

Figure 1:
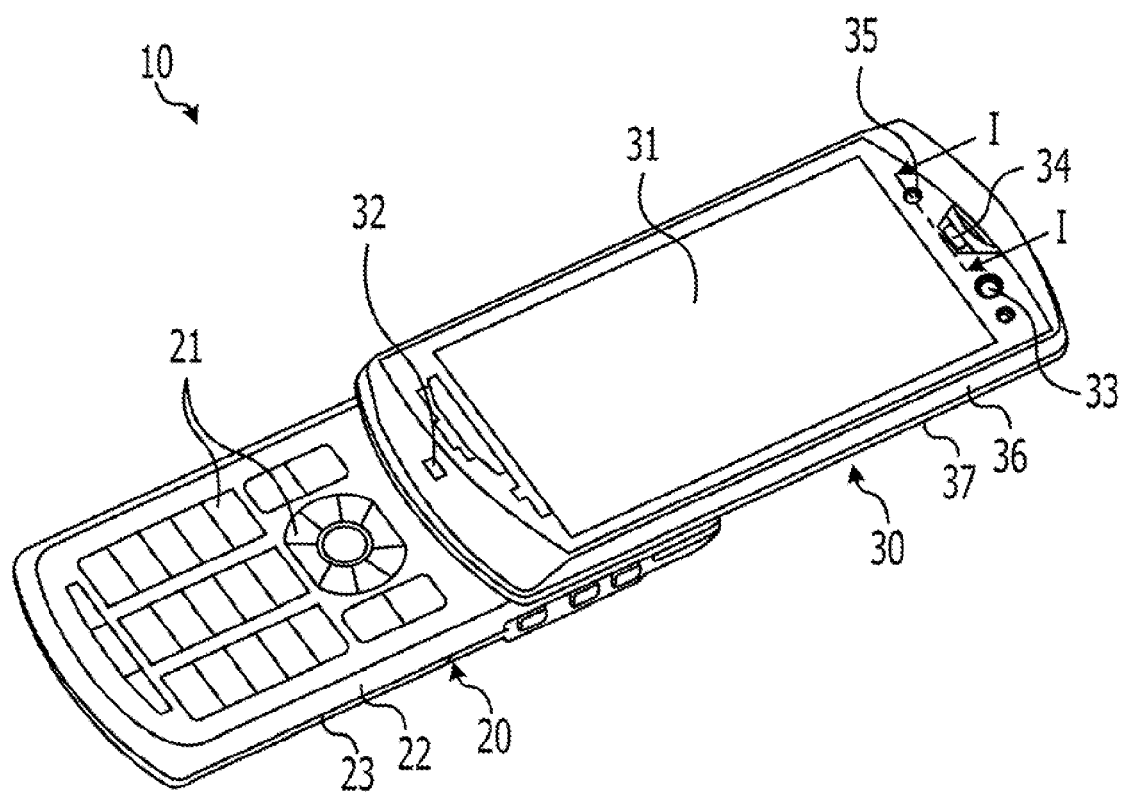
FIG. 1 is an external perspective view illustrating a cellular phone according to this embodiment.

The external configuration of a cellular phone according to this embodiment will be described with reference to FIG. 1. FIG. 1 is an external perspective view illustrating a cellular phone 10 according to this embodiment. The cellular phone 10 according to this embodiment has two palm-size housings 20 and 30. The two housings 20 and 30 are slidably connected by a connecting portion such as a slide mechanism.

The housing 20 is a fixed housing provided with an operation key portion 21 including a multifunction key, an enter key, a mode key, dial keys, and so forth. The housing 30 is a movable housing provided with a front panel 31, a telephone transmitting portion 32, a camera portion 33, a telephone receiving portion 34, an incoming notification portion 35, and so forth. FIG. 1 illustrates a state where the movable housing 30 is opened relative to the fixed housing 20 by sliding the movable housing 30 relative to the fixed housing 20.

The operation key portion 21 receives the user's input operation. For example, the operation key portion 21 receives the input operation of the telephone number of the other party and the input operation of calling or disconnecting. The front panel 31 is a transparent panel member covering the front of the housing 30 and exposes the display screen of an LCD (Liquid Crystal Display) placed inside the housing 30, the incoming notification portion 35, and so forth so that they are visible from outside the device.

The telephone transmitting portion 32 is a through-hole that leads to a microphone placed inside the housing 30. The user's voice enters the housing 30 through the telephone transmitting portion 32 and is received by the microphone. The camera portion 33 has a camera module for capturing images and captures an image of an object in response to the user's operation through the operation key portion 21.

The telephone receiving portion 34 is a through-hole that leads to a receiver placed inside the housing 30. Inside the housing 30, a receiver is placed that emits the other party's voice. The voice emitted from the receiver is released outside the device through the telephone receiving portion 34.

The incoming notification portion 35 is formed in a part of the front panel 31 and releases light emitted from an LED placed inside the housing 30 outside the device. For example, at the time of an incoming call, the incoming notification portion 35 releases light of a specified color or pattern for notifying the user of the incoming call to outside the device.

The housing 20 has such a structure that it is divided into a front exterior case 22 located on the operation key portion 21 side, the internal side, and a back exterior case 23 located on the back side, the external side. The housing 30 has such a structure that it is divided into a front exterior case 36 located on the front panel 31 side, the external side, and a back exterior case 37 located on the back side, the internal side.

Figure 2:
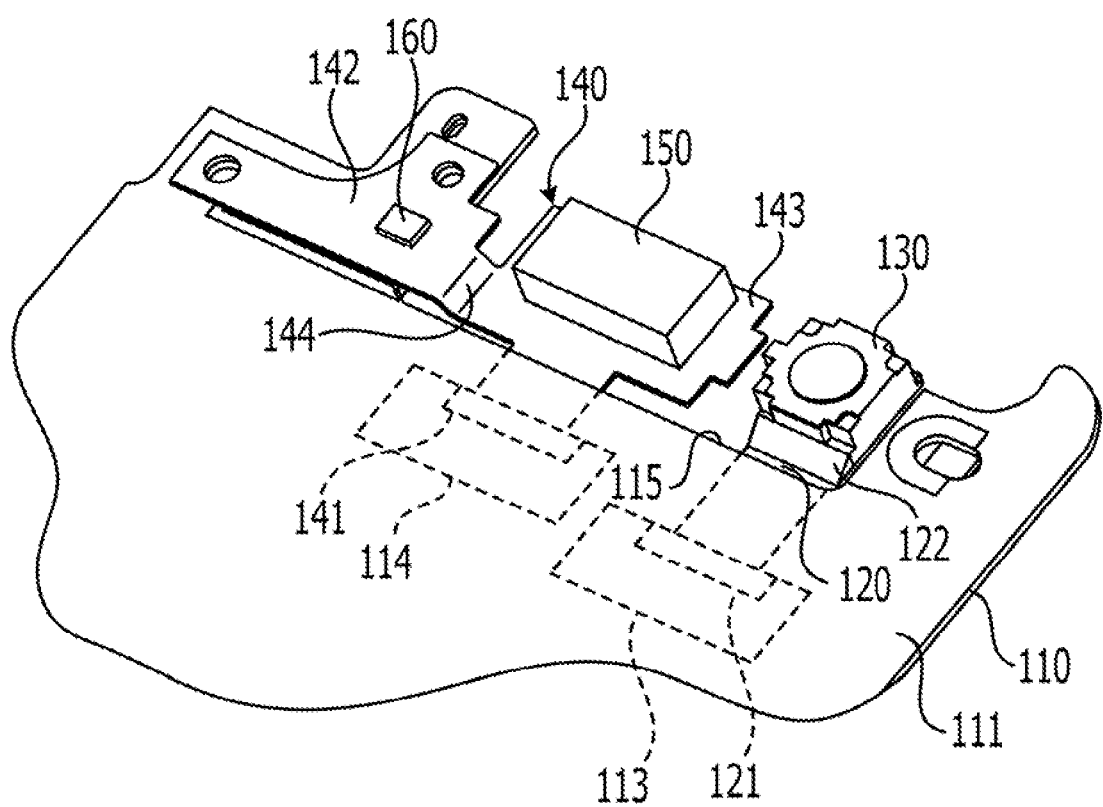
FIG. 2 is an external perspective view illustrating an example of internal configuration of the housing with the exterior case and so forth removed.
Figure 3:
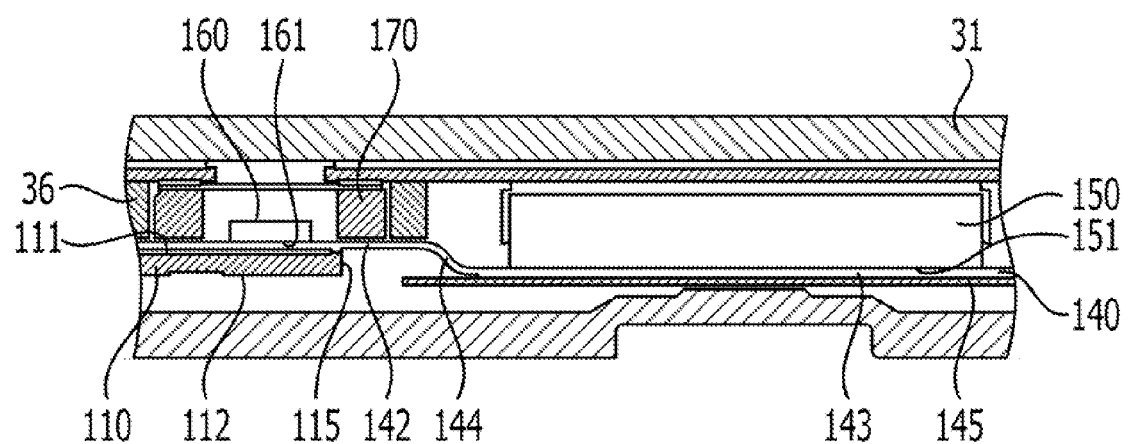
FIG. 3 schematically illustrates the section taken along line I-I of FIG. 1.

With reference to FIGS. 2 and 3, the internal configuration of the housing 30 in the vicinity of the incoming notification portion 35 will be described. FIG. 2 is an external perspective view illustrating an example of internal configuration of the housing 30 with the exterior case and so forth removed. FIG. 3 schematically illustrates the section taken along line I-I of FIG. 1. As illustrated in FIGS. 2 and 3, the movable housing 30 has a circuit board 110, a camera flexible substrate 120, a camera module 130, a receiver flexible substrate 140, a receiver 150, and an LED 160.

The circuit board 110 is placed inside the housing 30 so as to face the front panel 31. On the circuit board 110 are mounted various circuit components. The circuit board 110 has a facing surface 111 facing the front panel 31 and a surface 112 on the side opposite to the facing surface 111. On the surface 112 are formed a connector portion 113 connected to a base end portion 121 of the camera flexible substrate 120 and a connector portion 114 connected to a base end portion 141 of the receiver flexible substrate 140. At an end of the circuit board 110 where the connector portions 113 and 114 are formed, a cutout portion 115 is formed. The cutout portion 115 has such size and shape that it may accommodate the camera module 130 and the receiver 150.

The camera flexible substrate 120 is a flexible cable formed of a flexible material and has a base end portion 121 connected to the connector portion 113 of the circuit board 110 and a distal end portion 122 extending to the cutout portion 115. The camera module 130 is a module including a camera IC including an image sensor, such as a CCD (Charge Coupled Device), integrated with an objective lens, the camera IC being mounted on a substrate. The bottom of the camera module 130 is connected to the distal end portion 122 of the camera flexible substrate 120.

The receiver flexible substrate 140 is a flexible cable formed of a flexible material. The receiver flexible substrate 140 has a base end portion 141 connected to the connector portion 114 of the circuit board 110. The receiver flexible substrate 140 has an intermediate portion 143 extending from the base end portion 141 to the cutout portion 115. The receiver flexible substrate 140 has a distal end portion 142 placed on the facing surface 111 of the circuit board 110. The intermediate portion 143 extending to the cutout portion 115 and the distal end portion 142 placed on the facing surface 111 of the circuit board 110 are connected by a connecting portion 144 that is smaller in width than the intermediate portion 143 and the distal end portion 142. To the bottom of the intermediate portion 143 is attached a positioning member 145 for fixing the intermediate portion 143 to a specified position inside the housing 30.

The receiver 150 is a device that emits the other party's voice toward the telephone receiving portion 34. The bottom 151 of the receiver 150 is connected to the intermediate portion 143 of the receiver flexible substrate 140 extending to the cutout portion 115. The bottom of the receiver 150 is disposed at a position more distant from the front panel 31 than the facing surface 111 of the circuit board 110.

The LED 160 is a light source that emits light toward the front panel 31, and is covered by a light shielding member 170 except for the light emitting surface. The LED 160 is smaller in thickness than the receiver 150 and the camera module 130. The bottom 161 of the LED 160 is connected to the distal end portion 142 of the receiver flexible substrate 140 placed on the facing surface 111 of the circuit board 110.

The reason that the bottom 161 of the LED 160 is connected not to the camera flexible substrate 120 but to the receiver flexible substrate 140 is as follows. The camera module 130 connected to the distal end portion 122 of the camera flexible substrate 120 is susceptible to electromagnetic noise. For this reason, it is undesirable to place an electronic component that generates electromagnetic noise near the camera module 130. The LED 160 is an electronic component that generates electromagnetic noise although the noise is small. Therefore, in this embodiment, from the viewpoint of reducing the effect of electromagnetic noise on the camera module 130, the bottom 161 of the LED 160 is connected not to the camera flexible substrate 120 but to the receiver flexible substrate 140.

The procedure for connecting the receiver 150 and the LED 160 to the circuit board 110 will be described.

(1) In this embodiment, the bottom 151 of the receiver 150 is connected to the intermediate portion 143 of the receiver flexible substrate 140. The bottom 161 of the LED 160 is connected to the distal end portion 142 of the receiver flexible substrate 140.

(2) The base end portion 141 of the receiver flexible substrate 140 to which the receiver 150 and the LED 160 are connected is connected to the connector portion 114 of the circuit board 110. At this time, the intermediate portion 143 of the receiver flexible substrate 140 is disposed at a position corresponding to the cutout portion 115 of the circuit board 110, and the distal end portion 142 is placed on the facing surface 111 of the circuit board 110.

(3) In this embodiment, a light shielding member 170 is attached around the LED 160 connected to the distal end portion 142 of the receiver flexible substrate 140, and then the front panel 31 is attached to the front of the housing 30. At this time, the front panel 31 presses down the receiver 150. By pressing down the receiver 150, the receiver 150 and the intermediate portion 143 of the receiver flexible substrate 140 to which the receiver 150 is connected enter the cutout portion 115 of the circuit board 110. Therefore, the bottom of the receiver 150 is disposed at a position more distant from the front panel 31 than the facing surface 111 of the circuit board 110. Because the intermediate portion 143 extending to the cutout portion 115 and the distal end portion 142 placed on the facing surface 111 of the circuit board 110 are connected by the narrow connecting portion 144, the connecting portion 144 is easily bent and the receiver 150 smoothly enters the cutout portion 115.

Therefore, in this embodiment, even when the receiver 150 placed between the front panel 31 and the circuit board 110 is relatively large in thickness, the distance between the front panel 31 and the circuit board 110 may be set smaller than the thickness of the receiver 150. As a result, in this embodiment, the receiver 150 does not prevent the reduction in thickness of the device.

In this embodiment, the bottom of the receiver 150 is disposed at a position more distant from the front panel 31 than the facing surface 111 of the circuit board 110, whereas the bottom of the LED 160 is disposed on the facing surface 111 of the circuit board 110. In this embodiment, the distance between the LED 160 and the front panel 31 is not limited by the thickness of the receiver 150, and the LED 160, which is thinner than the receiver 150, may be placed close to the front panel 31. As a result, in this embodiment, light emitted from the LED 160 may be projected onto the front panel 31 and efficiently released through the incoming notification portion 35 to outside the device.

As described above, in this embodiment, a circuit board 110 has a cutout portion 115 formed in a part thereof, and a receiver flexible substrate 140 has a base end portion 141 connected to the circuit board 110, an intermediate portion 143 extending to the cutout portion 115, and a distal end portion 142 placed on a facing surface 111 of the circuit board 110. In this embodiment, the bottom 151 of a receiver 150 is connected to the intermediate portion 143 of the receiver flexible substrate 140, and the bottom 161 of an LED 160, which is thinner than the receiver 150, is connected to the distal end portion 142 of the receiver flexible substrate 140. In this embodiment, the receiver 150 and the intermediate portion 143 of the receiver flexible substrate 140 enter the cutout portion 115, and the bottom of the receiver 150 is disposed at a position more distant from the front panel 31 than the facing surface 111 of the circuit board 110. Therefore, in this embodiment, the thickness of the receiver 150 is absorbed by the cutout portion 115 of the circuit board 110. In this embodiment, compared to the conventional method in which an LED and a receiver are mounted on the same circuit board, the thickness of the device may be reduced.

In this embodiment, the bottom of the receiver 150 is disposed at a position more distant from the front panel 31 than the facing surface 111 of the circuit board 110, whereas the bottom of the LED 160 is disposed on the facing surface 111 of the circuit board 110. In this embodiment, the distance between the LED 160 and the front panel 31 is not limited by the thickness of the receiver 150, and the LED 160, which is thinner than the receiver 150, may be placed close to the front panel 31. As a result of placing the LED 160 close to the front panel 31, in this embodiment, light emitted from the LED 160 may be projected onto the front panel 31 and efficiently released through the incoming notification portion 35 to outside the device. In this embodiment, it is possible to efficiently release light from the light source to outside the device while reducing the thickness of the device.

Figure 4:
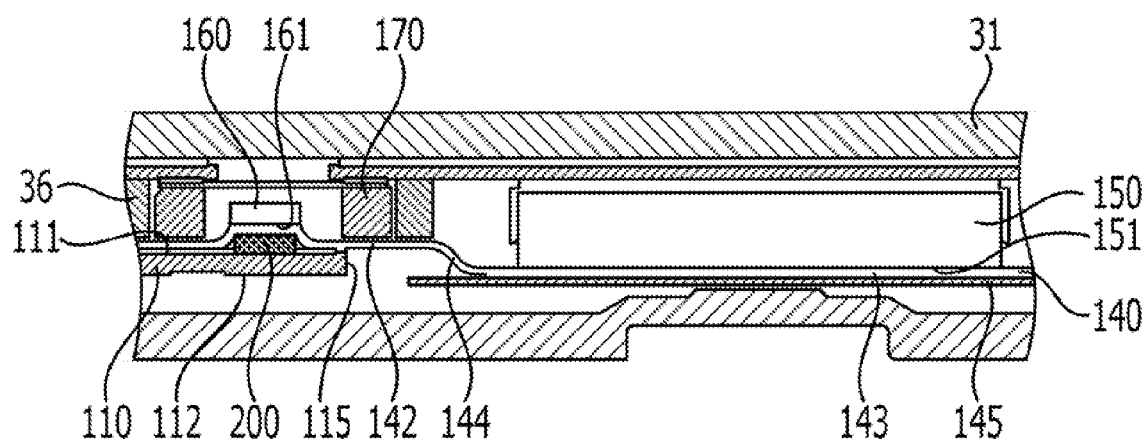
FIG. 4 schematically illustrates another example of the section taken along line I-I of FIG. 1.
Figure 5:
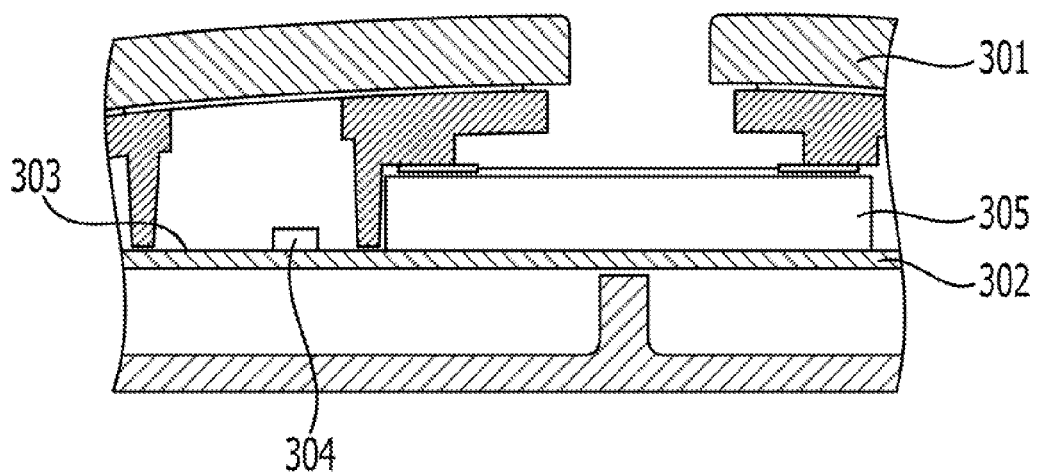
FIG. 5 is a sectional view of the vicinity of a light source in a portable terminal device.

In this embodiment, an example is illustrated in which the distal end portion 142 of the receiver flexible substrate 140 is placed directly on the facing surface 111 of the circuit board 110. Alternatively, a bottom raising component 200 may be placed between the facing surface 111 of the circuit board 110 and the distal end portion 142 as illustrated in FIG. 4. FIG. 4 schematically illustrates another example of the section taken along line I-I of FIG. 1. The bottom raising component 200 is formed of a buffer material such as sponge or rubber, and is attached to the facing surface 111 of the circuit board 110 with adhesive or the like.

In a cellular phone 10 having the bottom raising component 200, the height position of the LED 160 connected to the distal end portion 142 of the receiver flexible substrate 140 may be regulated by the thickness of the bottom raising component 200. Therefore, the LED 160 may be placed closer to the front panel 31, and light emitted from the LED 160 may be projected onto the front panel 31 and efficiently released through the incoming notification portion 35 to outside the device.

In this embodiment, a slide-type cellular phone using a slide mechanism that slidably connects housings 20 and 30 is taken as an example. However, a portable terminal device disclosed in this application may also be applied to cellular phones other than the slide type. For example, a portable terminal device disclosed in this application may also be applied to a folding type and a portable terminal device in which one housing is connected to the other housing so as to be movable relative thereto by a plane rotation type connecting portion.

In this embodiment, an example of application to a cellular phone as a portable terminal device has been described. However, a portable terminal device disclosed in this application is not limited to a cellular phone. For example, a portable terminal device disclosed in this application may also be applied to other various portable terminal devices such as a compact information processing terminal such as a PDA, a compact music reproduction device, a portable TV, and a portable game machine.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions has been described in detail, it should be understood that the various changes, substitutions, and alterations could be made hereto without departing from the spirit and scope of the invention.

What is claimed is:

1. A portable terminal device comprising:
   a front panel covering the front of a housing;
   a circuit board placed inside the housing so as to face the front panel and having a cutout portion formed in a part thereof;
   a flexible substrate having a base end portion connected to the circuit board, extending from the base end portion to the cutout portion, and having a distal end portion placed on a facing surface of the circuit board facing the front panel;
   an electronic component having a bottom, the bottom of the electronic component which is connected to an intermediate portion of the flexible substrate, and being disposed at a position distant from the front panel than the facing surface of the circuit board; and a light source having a bottom, the bottom of the light source which is connected to the distal end portion of the flexible substrate, is smaller in thickness than the electronic component, and emits light toward the front panel.

2. The portable terminal device according to claim 1, further comprising a camera arranged on a side of the electronic component that is opposite the light source.

3. A portable terminal device comprising:
a front panel covering the front of a housing;
a circuit board placed inside the housing so as to face the front panel and having a cutout portion formed in a part thereof;
a flexible substrate having a base end portion connected to the circuit board, extending from the base end portion to the cutout portion, and having a distal end portion placed on a facing surface of the circuit board facing the front panel;
an electronic component having a bottom, the bottom of the electronic component which is connected to an intermediate portion of the flexible substrate, and being disposed at a position distant from the front panel than the facing surface of the circuit board; and
a light source having a bottom, the bottom of the light source which is connected to the distal end portion of the flexible substrate, is smaller in thickness than the electronic component, and emits light toward the front panel, wherein the intermediate portion of the flexible substrate extending to the cutout portion and the distal end portion of the flexible substrate placed on the facing surface of the circuit board are connected by a connecting portion that is smaller in width than the intermediate portion and the distal end portion.

4. A portable terminal device comprising:
a front panel covering the front of a housing;
a circuit board placed inside the housing so as to face the front panel and having a cutout portion formed in a part thereof;
a flexible substrate having a base end portion connected to the circuit board, extending from the base end portion to the cutout portion, and having a distal end portion placed on a facing surface of the circuit board facing the front panel;
an electronic component having a bottom, the bottom of the electronic component which is connected to an intermediate portion of the flexible substrate, and being disposed at a position distant from the front panel than the facing surface of the circuit board;
a light source having a bottom, the bottom of the light source which is connected to the distal end portion of the flexible substrate, is smaller in thickness than the electronic component, and emits light toward the front panel; and
a bottom raising component, wherein the bottom raising component is placed between the facing surface of the circuit board and the distal end portion of the flexible substrate.

* * * * *